United States Patent
Nehls

(10) Patent No.: US 9,834,921 B2
(45) Date of Patent: Dec. 5, 2017

(54) RETROFIT BRACE FITTING

(71) Applicant: Unistrut International Corporation, Wayne, MI (US)

(72) Inventor: Charles O. Nehls, Allen Park, MI (US)

(73) Assignee: Unistrut International Corporation, Harvey, IL (US)

( * ) Notice: Subject to any disclaimer, the term of this patent is extended or adjusted under 35 U.S.C. 154(b) by 0 days.

(21) Appl. No.: 14/974,753

(22) Filed: Dec. 18, 2015

(65) Prior Publication Data

US 2017/0175380 A1   Jun. 22, 2017

(51) Int. Cl.
*E04B 1/41*   (2006.01)

(52) U.S. Cl.
CPC ...................... *E04B 1/40* (2013.01)

(58) Field of Classification Search
None
See application file for complete search history.

(56) References Cited

U.S. PATENT DOCUMENTS

| | | | | | |
|---|---|---|---|---|---|
| 4,065,218 | A | * | 12/1977 | Biggane | E04C 3/02 403/209 |
| 5,007,603 | A | * | 4/1991 | Kirschner | F16L 3/20 248/224.8 |
| 5,145,132 | A | * | 9/1992 | Kirschner | F16L 3/20 248/224.7 |
| 5,188,317 | A | * | 2/1993 | Roth | F16L 3/24 248/59 |
| 5,412,843 | A | * | 5/1995 | Krongauz | E05D 5/06 16/387 |
| 5,984,566 | A | * | 11/1999 | Blaha | A47B 87/002 16/269 |
| 6,050,035 | A | * | 4/2000 | Thompson | F16L 3/24 248/351 |
| 6,247,274 | B1 | * | 6/2001 | Thompson | F16B 9/02 248/351 |
| 6,415,560 | B1 | * | 7/2002 | Rinderer | F16B 7/18 248/351 |
| 6,421,965 | B2 | * | 7/2002 | Thompson | F16B 9/02 248/351 |
| 6,837,009 | B1 | * | 1/2005 | Roth | E04H 9/02 24/563 |
| 7,661,915 | B2 | * | 2/2010 | Whipple | F16B 37/0885 411/151 |
| 2004/0020140 | A1 | * | 2/2004 | Allmon | E04H 9/02 52/167.1 |
| 2006/0024127 | A1 | * | 2/2006 | Heath | F16L 3/133 403/150 |

* cited by examiner

*Primary Examiner* — Brian Glessner
*Assistant Examiner* — Adam Barlow

(57) ABSTRACT

Embodiments of the present disclosure provide a retrofitable brace fitting assembly. In one approach, a brace platform has a first side, a second side, and a platform slot extending inwardly from an outer edge. The brace platform further includes a post disposed on the first side of the platform for engagement with a corresponding opening in a brace fitting, and a tab disposed on the second side of the platform for engagement with a strut. To restrict rotation of the platform relative to the strut, the tab may extend into an opening of the strut for engagement with an inward turn edge of the strut, or the tab may extend along and abut an exterior surface of the strut. The brace platform may further include a reinforcement post for engagement with a threaded rod, the reinforcement post extending through a corresponding opening in the brace fitting.

19 Claims, 7 Drawing Sheets

US 9,834,921 B2

RETROFIT BRACE FITTING

FIELD OF THE DISCLOSURE

The present embodiments relate generally to brace fittings and, more particularly, to a retrofit brace fitting for attaching a brace to a strut.

BACKGROUND OF THE DISCLOSURE

Building elements such as struts are used for support structures and bracing members. The struts may be produced in a variety of sizes and steel gages. Frequently, the strut is formed with holes or slots to facilitate securing sections of the strut with one another and for securing the strut to walls and other structures or appurtenances. The strut is generally secured using a threaded rod, washers and nuts. Typically, the end of a threaded rod is inserted through a slot in the strut whereupon a washer and nut are secured to the end thereof. The washer and nut prevent the rod from being withdrawn through the slot in the channel.

Different types of braces are currently used for connecting together multiple struts. For example, some current designs use hinges that pivot two elements into an installed position. However, the hinge adds unnecessary components and labor, and is often a weak point of the overall fitting. Furthermore, the hinge may not prevent rotation relative to the strut. Other current designs use hooked and/or slotted washer solutions. However, hooked designs typically don't have load capacity in all directions, and the hooks/slotted washer fail to prevent rotation when coupled to the strut.

SUMMARY OF THE DISCLOSURE

In view of the foregoing, what is needed is a retrofitable brace fitting that attaches a brace to a strut, and prevents rotation of the brace relative to the strut. To accomplish this, embodiments of the present disclosure provide a brace platform having a first side, a second side, and a platform slot extending inwardly from an outer edge. The brace platform further includes a post disposed on the first side of the platform for engagement with a corresponding opening in a brace fitting, and a tab disposed on the second side of the platform for engagement with a strut. To restrict rotation of the platform relative to the strut, the tab may extend into an opening of the strut for engagement with an inward turn edge of the strut, or the tab may extend along and abut an exterior surface of the brace. The brace platform may further include a reinforcement post disposed on the first side of the platform for engagement with a threaded rod, the reinforcement post extending through a corresponding opening in the brace fitting.

An exemplary approach in accordance with the present disclosure may include a retrofit brace platform having a first side, a second side, and a platform slot extending inwardly from an outer edge of the brace platform, a post disposed on the first side of the brace platform for engagement with a corresponding opening in a brace fitting, and a tab disposed on the second side of the brace platform for engagement with a brace member to restrict rotation of the brace platform relative to the brace member.

Another exemplary approach in accordance with the present disclosure may include a brace fitting assembly having a platform having a first side and a second side, a brace fitting coupled to the first side of the platform, a post disposed on the first side of the platform for engagement with a corresponding opening in the brace fitting, and a tab disposed on the second side of the platform for engagement with a strut to restrict rotation of the platform relative to the strut.

An exemplary approach in accordance with the present disclosure may include an assembly having a platform including a first side, a second side, and a platform slot extending inwardly from an outer edge of the platform, a brace fitting coupled to the first side of the platform, and a plurality of posts and a reinforcement post disposed on the first side of the platform for engagement with a corresponding plurality of openings in the brace fitting, the reinforcement post in abutment with a threaded rod. The assembly may further include a plurality of tabs disposed on the second side of the platform for engagement with a strut to restrict rotation of the platform relative to the strut, the plurality of tabs each having an inner surface, a sloped outer surface, and at least one end surface.

Figure 1A:
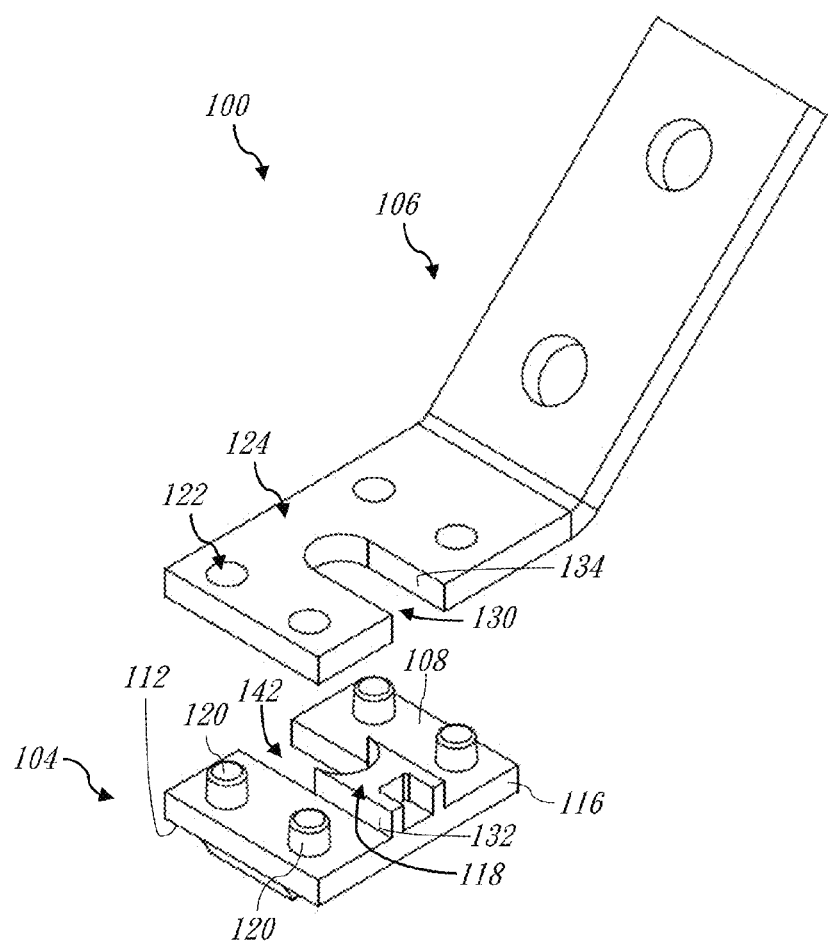
FIG. 1A depicts an exploded perspective view of a brace fitting assembly in accordance with an embodiment of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now be described more fully hereinafter with reference to the accompanying drawings, where embodiments of the retrofit brace fitting assembly are shown. The brace fitting assembly may be embodied in many different forms and is not to be construed as being limited to the embodiments set forth herein. Instead, these embodiments are provided so this disclosure will be thorough and complete, and will fully convey the scope of the apparatus to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, each with respect to the geometry and orientation of a component of the retrofit brace fitting assembly as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

As further described herein, provided herein are brace fitting assemblies. In an exemplary approach, a brace platform has a first side, a second side, and a platform slot extending inwardly from an outer edge. The brace platform further includes a post disposed on the first side of the platform for engagement with a corresponding opening in a brace fitting, and a tab disposed on the second side of the platform for engagement with a strut. To restrict rotation of the platform relative to the strut, the tab may extend into an opening of the strut for engagement with an inward turn edge of the strut, or the tab may extend along and abut an exterior surface of the brace. The brace platform may further include a reinforcement post disposed on the first side of the platform for engagement with a threaded rod, the reinforcement post extending through a corresponding opening in the brace fitting.

The embodiments of the present disclosure advantageously provide an efficient two-piece design that eliminates extra hardware elements (e.g., hinges), reduces weak spots from hardware, and reduces the costs of labor to install such hardware. Furthermore, the anti-rotation tabs on the brace platform advantageously prevent rotation and distribute load of the brace platform when mounted to the strut, while one or more posts extending from on the brace platform engage with the brace fitting to provide a strong connection therebetween.

Figure 1B:
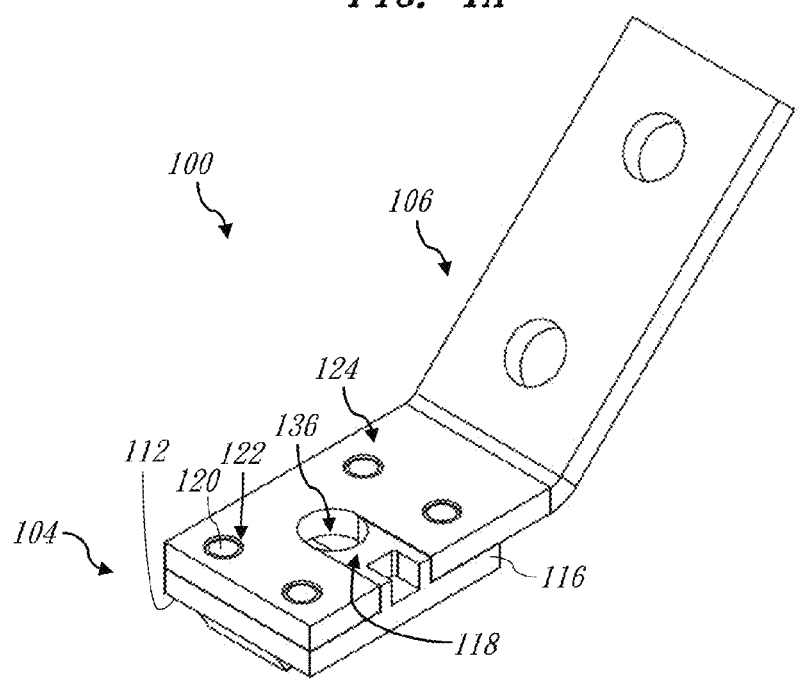
FIG. 1B depicts a perspective view of the brace fitting assembly of FIG. 1A in accordance with an embodiment of the present disclosure.

Turning now to FIGS. 1A-B, a brace fitting assembly 100 according to various embodiments of the disclosure will be described in greater detail. As shown, the brace fitting assembly 100 (hereinafter "assembly") includes a brace platform 104 (hereinafter "platform") and a brace 106, the platform 104 having a first side 108, a second side 112 opposite the first side 108, and an outer edge 116. The platform 104 further includes a plurality of posts 120 disposed on the first side 108 for engagement with corresponding openings 122 in a brace fitting 124. As shown, the plurality of posts 120 extend through each of the openings 122 to increase load capacity and prevent rotation between the platform 104 and the brace fitting 124.

Rotational restriction is further provided by a reinforcement post 118 disposed on the first side 108 of the platform 104, wherein the reinforcement post 118 extends perpendicularly from the first side 108 for receipt through a slot 130 of the brace fitting 124. The reinforcement post 118 includes a set of exterior sidewalls 132 configured to align with an interior surface 134 of the slot 130 when the platform 104 and the brace fitting 124 are coupled together, for example, as demonstrated in FIG. 1B. The reinforcement post 118 is generally sized so that the set of sidewalls 132 align with the interior surface 134 to prevent rotation therebetween. Furthermore, a platform slot 142 and the slot 130 of the brace fitting 124 form an opening 136 through the brace fitting assembly 100, wherein the opening 136 is generally sized to receive a threaded rod therein. During assembly, the platform slot 142 and the slot 130 of the brace fitting 124 allow installation onto an existing strut support system without disassembly.

Figure 2A:
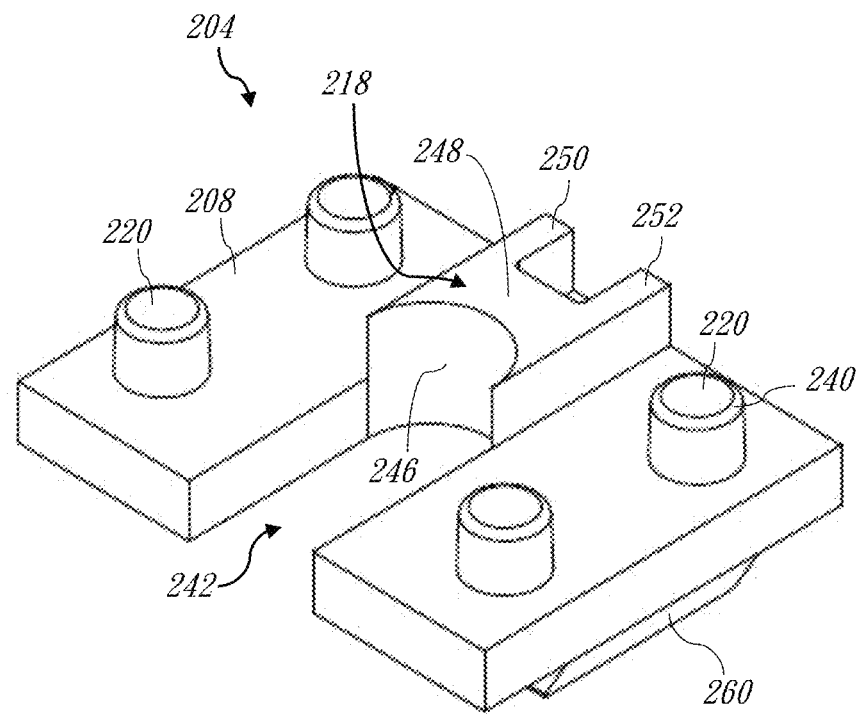
FIG. 2A depicts a top perspective view of a brace platform in accordance with an embodiment of the present disclosure.
Figure 2B:
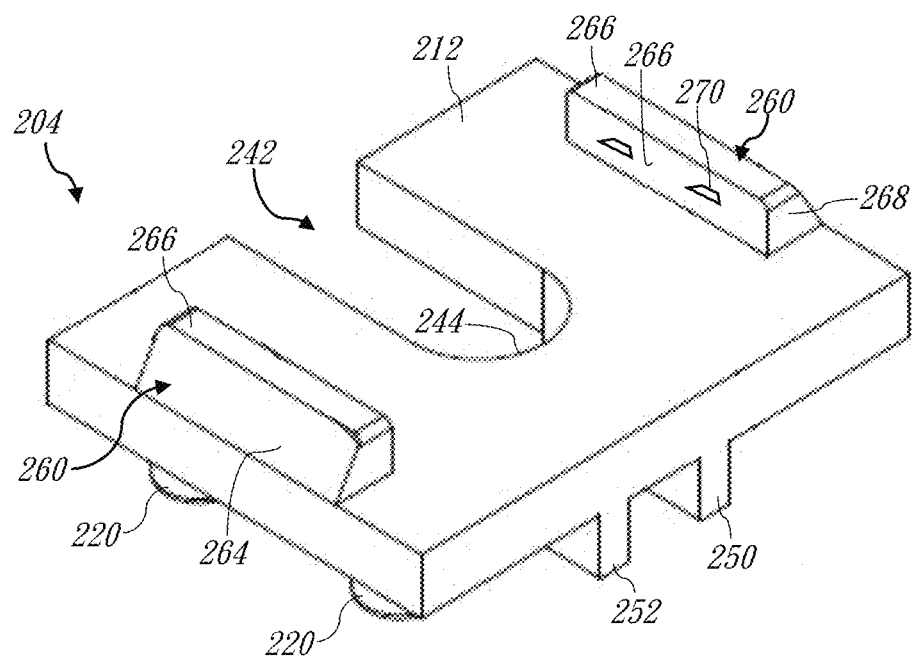
FIG. 2B depicts a bottom perspective view of the brace platform of FIG. 2A in accordance with an embodiment of the present disclosure.

Turning now to FIGS. 2A-B, an exemplary platform according to embodiments of the disclosure will be described in greater detail. As shown, the platform 204 includes the first side 208, the second side 212, and the outer edge 216 connecting the first side 208 to the second side 212. The platform 204 further includes a plurality of posts 220 integrally coupled with the first side 208 for engagement with the openings 122 in the brace fitting 124 (FIGS. 1A-B). In a non-limiting embodiment, each post 220 is cylindrical, and extends perpendicularly from the first side 208. A top edge 240 of the plurality of posts 220 may be beveled, as shown, to facilitate insertion within the openings 122 in the brace fitting 124.

The platform 204 further includes the platform slot 242 extending inwardly from the outer edge 216, the platform slot 242 configured to receive a threaded rod therein. The slot 242 terminates at a closed end 244, defined by a curved surface 246 of the reinforcement post 218. As shown, the reinforcement post 218 extends above the first side 208, and includes a cross support member 248 connecting first and second side support members 250, 252. In some embodiments, the reinforcement post 218 may be integrally coupled with the platform 204.

As further shown in FIGS. 2A-B, the platform 204 includes a set of (i.e., one or more) tabs 260 disposed on the second side 212 for engagement with a strut to restrict rotation of the platform 204 relative to the strut, as will be described in further detail below. The tabs 260 extend substantially perpendicularly from the second side 212 of the platform 204, each tab 260 including an inner surface 262, an outer surface 264, a top surface 266, and one or more end surfaces 268. As shown, each tab 260 extends along the outer perimeter 216 of the platform, and is oriented generally parallel to the slot 242 of the platform 204. In some embodiments, the outer surface 264 is sloped, and the inner surface 262 includes one or more teeth 270 teeth or protrusions configured to penetrate the strut and increase the slip resistance of the platform 204 against the strut. As will be described in further detail below, depending on the selected configuration, the tabs 260 may either abut an inward turned edge of a strut, or an exterior surface of strut.

Figure 3A:
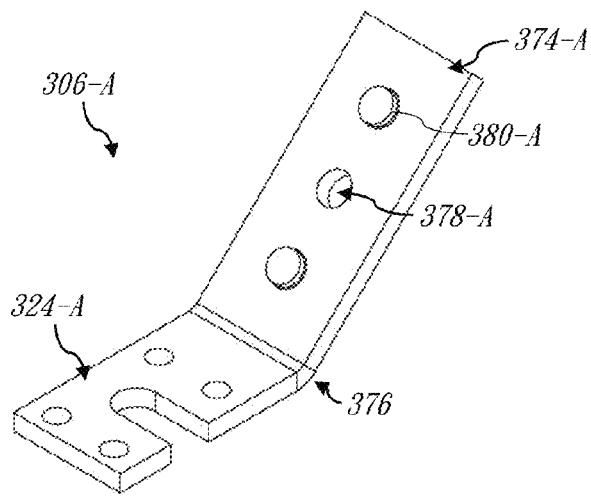
FIGS. 3A-C depict perspective views of various braces in accordance with embodiments of the present disclosure.
Figure 3B:
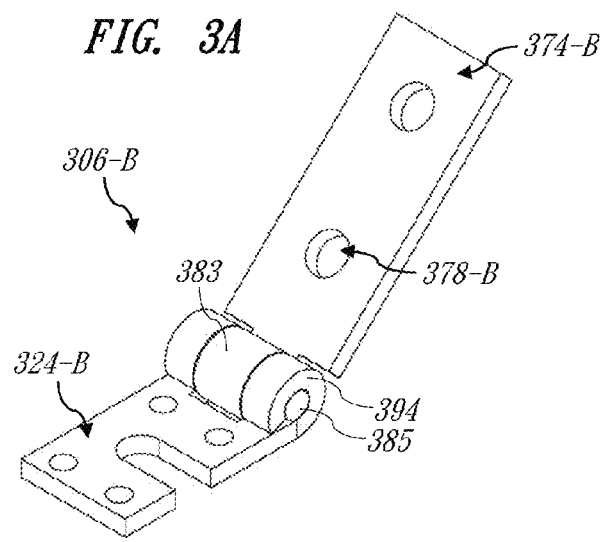
Figure 3C:
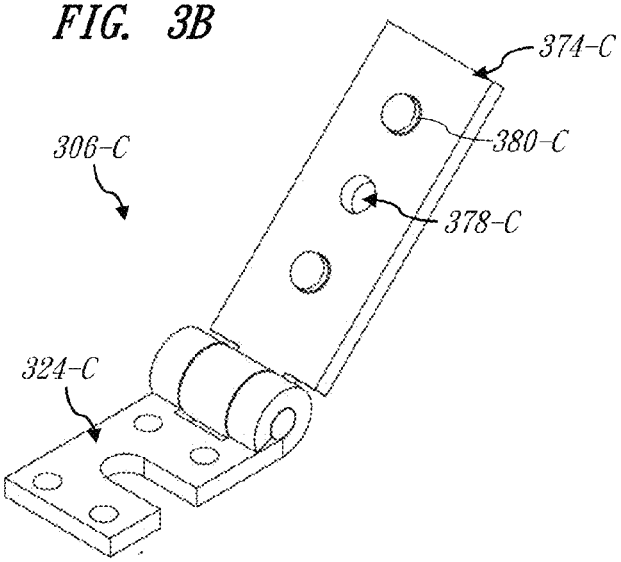

Turning now to FIGS. 3A-C, various braces according to exemplary embodiments of the disclosure will be described in greater detail. As will be appreciated, the platforms shown and described in FIGS. 1A-2B may be implemented together with any of braces 306A-C. In one embodiment, as demonstrated in FIG. 3A, the brace 306-A includes a brace fitting 324-A coupled to an arm member 374-A, which may be further coupled to a strut (not shown). In this embodiment, the brace fitting 324-A and the arm member 374-A are integrally connected by a fixed angle or rigid joint 376. As further shown, the arm member 374-A may include one or more openings 378-A for coupling the arm member 374-A to the strut, and one or more tabs 380-A for engagement with holes in another framing member (not shown).

In another embodiment, demonstrated in FIG. 3B, the brace fitting 324-B and the arm member 374-B are separate elements coupled together by a hinge 382. In this embodiment, the hinge 382 may include a central hinge member 383 integrally coupled with the arm member 374-B and a set of outer hinge members 384 integrally coupled with the brace fitting 324-B, wherein the central hinge member 383 and the set of outer hinge members 394 may pivot about a pin 385. As further shown, the arm member 374-A may include one or more openings 378-B for coupling the arm member 374-B to a strut. In another embodiment, as demonstrated in FIG. 3C, the arm member 374-C may include one or more openings 378-C for coupling the arm member 374-C to a strut, and one or more tabs 380-C.

Figure 4A:
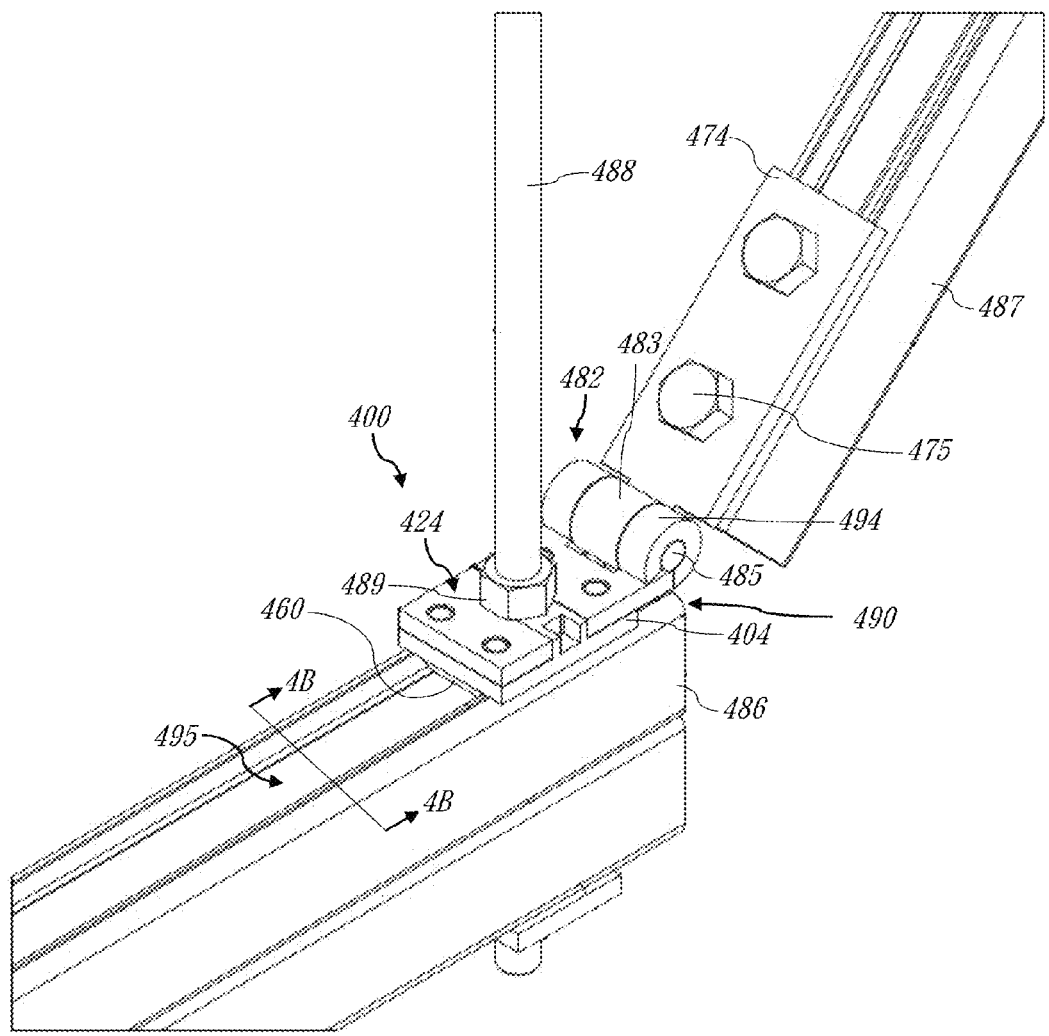
FIG. 4A depicts a perspective view of the brace fitting assembly of FIGS. 1A-B coupled to one or more struts in accordance with embodiments of the present disclosure.
Figure 4B:
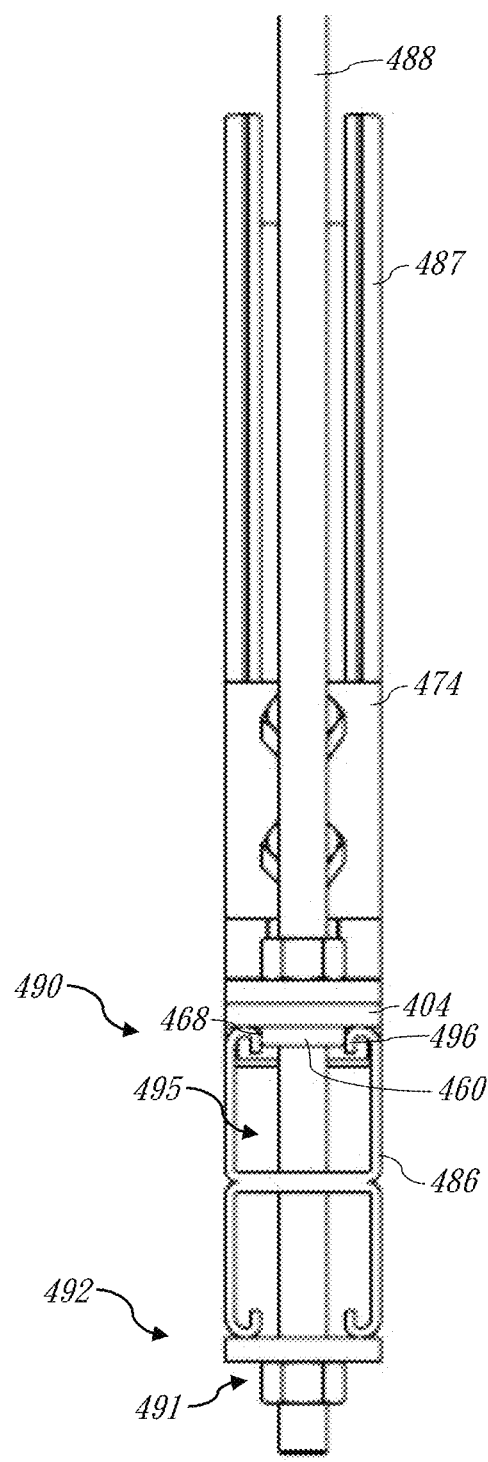
FIG. 4B depicts a cross-sectional view of the brace fitting assembly shown in FIG. 4A in accordance with embodiments of the present disclosure.

Turning now to FIGS. 4A-B, a brace fitting assembly coupling together multiple structural building elements according to embodiments of the present disclosure will be described. As shown, the brace fitting assembly 400 may couple together a first brace member 486 and a second brace member 487, both of which may include, among other structural building elements, struts, square tubes, and/or cables. In the non-limiting embodiment shown, the first brace member 486 includes a double or stacked strut configured to receive a threaded rod 488 therein. As shown, the threaded rod 488 passes through the brace fitting 424 and the platform 404, and is secured in place by a fastener 489, such as a hex nut, at a top end 490 of the first brace member 486. The fastener 489 may include a washer or fitting, as required. The threaded rod 488 may be further secured by a second fastener 491 at a bottom end 492 of the first brace member 486. In one embodiment, the second fastener 491 includes a hex nut and washer. Tightening of either the fastener 489 or the second fastener 491 compresses the components connected therebetween, and tightly secures the brace fitting 424 and the platform 404 to the first brace member 486.

As further shown, the platform 404 includes one or more tabs 460 extending into an interior 495 of the first brace member 486. In one embodiment, the end surface 468 of the tab 460 abuts a pair of inwardly turned edges 496 of the of the first brace member 486 to restrict rotation of the platform 404 relative to the first brace member 486. That is, the tab 460 is dimensioned to extend between the pair of inwardly turned edges 496 so that rotational forces between the first brace member 486, the platform 404, and/or the brace fitting 424 are mitigated.

In the non-limiting embodiment shown in FIGS. 4A-B, the brace fitting 424 and the arm member 474 may be joined by a hinge 482. As described above, the hinge 482 may include a central hinge member 483 integrally coupled with the arm member 474 and a set of outer hinge members 484 integrally coupled with the brace fitting 424, wherein the central hinge member 483 and the set of outer hinge members 494 are pivotable about a pin 485. As further shown, the arm member 474 include one or more fasteners (e.g., bolts) 475 for coupling the arm member 474 to the second brace member 487.

Figure 5A:
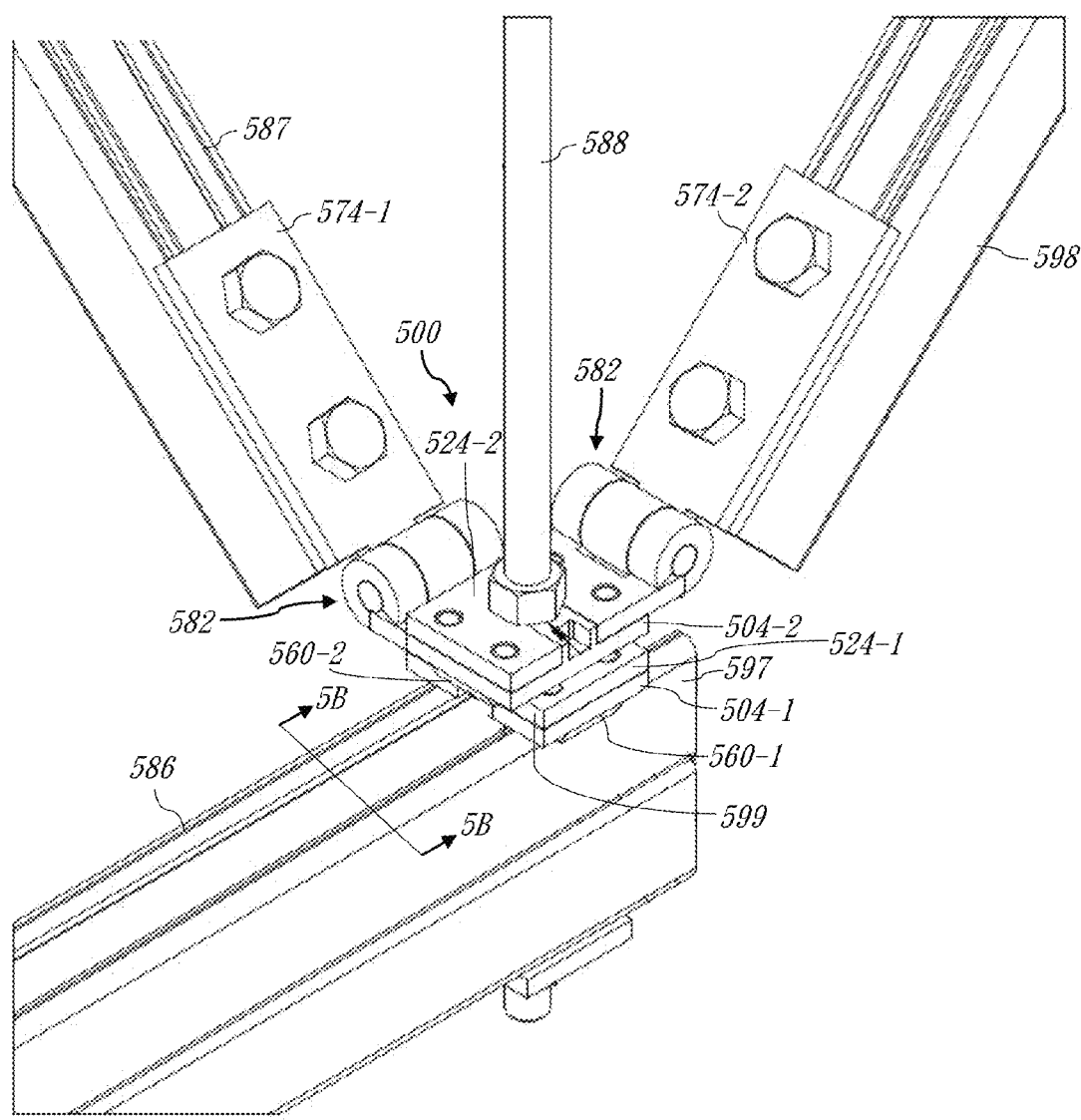
FIG. 5A depicts a perspective view of a brace fitting assembly coupled to one or more struts in accordance with embodiments of the present disclosure.
Figure 5B:
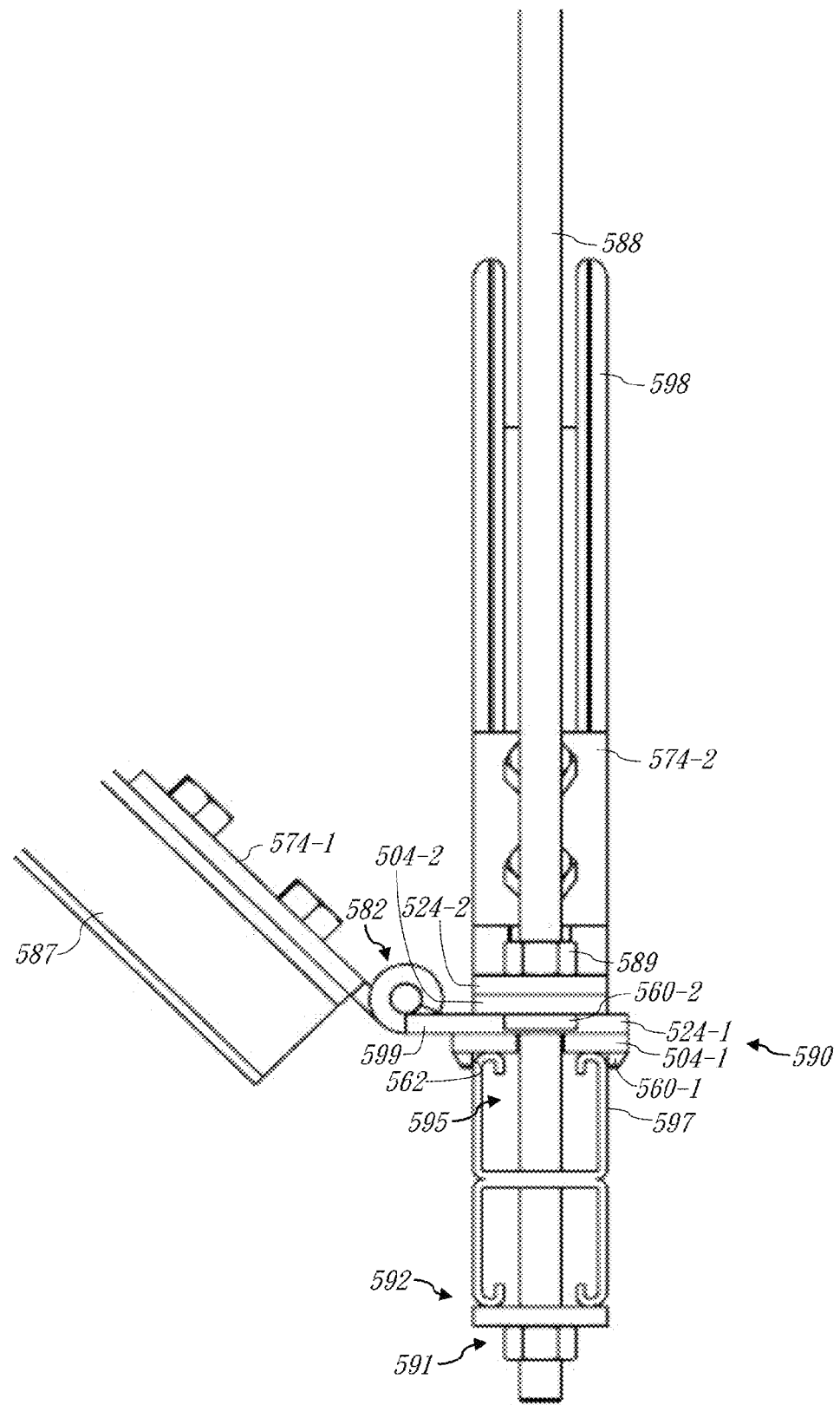
FIG. 5B depicts a cross-sectional view of the brace fitting assembly shown in FIG. 5A in accordance with embodiments of the present disclosure.

In another approach, as shown in FIGS. 5A-B, rotation between the first brace member 586 and the platform 504 can be restricted by positioning the tabs 560-1 outside of the first brace member 586 such that the tabs 560-1 abut an exterior surface 597 thereof. In this embodiment, the platform 504-1 may simply be rotated prior to being coupled and secured to the first brace member 586. For example, the tabs 560-1 may be positioned to extend along the exterior surface 597 of the first brace member 586 so that rotational forces between the platform 504, the first brace member 586, and/or the brace fitting 524 are mitigated. More specifically, the inner surfaces 562 of the tabs 560-1 abut the exterior surface 597. In some embodiments, slip resistance is increased at the interface between the inner surface 562 and the exterior surface 597 by a plurality of teeth or protrusions that penetrate the strut material, thus providing increased slip resistance. In still other embodiments, the platform 504 may include one or more tabs extending within the interior 595 of the first brace member 586, in addition to the externally positioned tabs, to provide further support.

As further demonstrated in FIGS. 5A-B, the brace fitting assembly 500 may include multiple, stacked platform/brace fitting pairs for coupling together three or more structural building elements (e.g., struts). Because each platform/brace fitting pair is slotted, the brace fitting assembly 500 may be added to an already installed threaded rod or fastener, without the need to uninstall the framing/support system.

As shown, the brace fitting assembly 500 includes a second platform 504-2 disposed atop the brace fitting 524-1, and a second brace fitting 524-2 coupled to the second platform 504-2. Together, the stacked platform/brace fitting pairs join together a first brace member 586, a second brace member 587, and a third brace member 598. Similar to embodiments described above, the first brace member 586 may include a double or stacked strut configured to receive the threaded rod 588, which is secured in place by a fastener 589, such as a hex nut, at a top end 590 of the first brace member 586, and a second fastener 591 at a bottom end 592 of the first brace member 586. However, in this embodiment, the threaded rod 588 passes through each of the platform 504-1, the second platform 504-2, the brace fitting 524-1, and the second brace fitting 524-2. Similar to above, in the non-limiting embodiment shown in FIGS. 5A-B, the brace fitting 524-1 and the second brace fitting 524-2 may respectively be joined to arm members 574-1 and 574-2 by a hinge 582.

In this embodiment, the second platform 504-2 includes a set of (i.e., one or more) tabs 560-2 disposed on an underside for engagement with the brace fitting 524-1 to restrict rotation therebetween. As shown, the tabs 560-2 extend substantially perpendicularly from the second platform 504-2, and each include an inner surface (not shown) in abutment with an outer surface 599 of the brace fitting 524-1. In some embodiments, the inner surface may include one or teeth that engage the outer surface 599 of the brace fitting 524-1 to increase the slip resistance therebetween.

As will be appreciated, a number of advantages are provided by the embodiments of the present disclosure. Firstly, the slotted platform and slotted brace fitting allow the apparatus to be used on an already installed threaded rod or fastener, without the need to uninstall the framing/support system. Furthermore, this slotted design allows for attachment to many different types of braces including, but not limited to, struts, square tubing, and cables. Secondly, the tabs prevent the assembly from rotating when attached to a strut. Thirdly, the platform includes a plurality of posts, which create a strong connection and load path between the platform and the brace fitting.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

The invention claimed is:

1. A brace platform comprising:
    a first side, a second side, and a platform slot extending inwardly from an outer edge of the brace platform;
    a plurality of posts disposed on the first side of the brace platform for engagement with corresponding openings in a brace fitting;
    a plurality of tabs disposed on the second side of the brace platform for engagement with a brace member to restrict rotation of the brace platform relative to the brace member.

2. The brace platform of claim 1, further comprising a reinforcement post disposed on the first side of the brace platform for engagement with a threaded rod.

3. The brace platform of claim 2, wherein the reinforcement post extends substantially perpendicularly from the first side of the brace platform for receipt through a slot of the brace fitting.

4. The brace platform of claim 2, wherein the reinforcement post is disposed at a closed end of a brace slot, and wherein the reinforcement post includes a curved surface for abutment with the threaded rod.

5. The brace platform of claim 1, wherein the plurality of tabs extend substantially perpendicularly from the second side of the platform, and wherein each of the plurality of tabs includes an inner surface, an outer surface and an end surface.

6. The brace platform of claim 1, wherein each of the plurality of tabs is oriented substantially parallel with the platform slot.

7. A brace fitting assembly:
    a platform having a first side and a second side;
    a brace fitting coupled to the first side of the platform;
    a post disposed on the first side of the platform for engagement with a corresponding opening in the brace fitting;
    a tab disposed on the second side of the platform for engagement with a strut to restrict rotation of the platform relative to the strut; and
    a reinforcement post disposed on the first side of the platform for engagement with a threaded rod.

8. The brace fitting assembly of claim 7, further comprising a platform slot extending inwardly from an outer edge of the platform.

9. The brace fitting assembly of claim 7, wherein the reinforcement post extends substantially perpendicularly from the first side of the platform for receipt through a slot of the strut, and wherein the reinforcement post is disposed at a closed end of the slot.

10. The brace fitting assembly of claim 7, wherein the reinforcement post includes a curved surface for abutment with the threaded rod.

11. The brace fitting assembly of claim 7, wherein the tab extends substantially perpendicularly from the second side of the platform, and wherein the tab included an inner surface, a sloped outer surface, and an end surface.

12. The brace fitting assembly of claim 11, wherein the tab extends into an interior of the strut, and wherein the end surface abuts an inwardly turned edge of the strut.

13. The brace fitting assembly of claim 11, wherein the inner surface of the tab abuts an exterior surface of the strut.

14. The brace fitting assembly of claim 7, further comprising:
    a second platform coupled to the brace fitting; and
    a second brace fitting coupled to a first side of the second platform, the threaded rod extending through each of the platform, the second platform, the brace fitting, and the second brace fitting.

15. The brace fitting assembly of claim 7, the brace fitting further including an arm member for coupling to a second strut.

16. An assembly comprising:
    a platform having a first side, a second side, and a platform slot extending inwardly from an outer edge of the platform;
    a brace fitting coupled to the first side of the platform;
    a plurality of posts and a reinforcement post disposed on the first side of the platform for engagement with a corresponding plurality of openings in the brace fitting, the reinforcement post in abutment with a threaded rod; and
    a plurality of tabs disposed on the second side of the platform for engagement with a strut to restrict rotation of the platform relative to the strut, the plurality of tabs each having an inner surface, and outer surface, and at least one end surface.

17. The assembly of claim 16, wherein the plurality of tabs extend into an interior of the strut, and wherein the at least one end surface abuts an inwardly turned edge of the strut.

18. The assembly of claim 16, wherein the inner surface of the tab abuts an exterior surface of the strut.

19. The assembly of claim 16, further comprising:
    a second platform coupled to the brace fitting; and
    a second brace fitting coupled to a first side of the second platform, the threaded rod extending through each of the platform, the second platform, the brace fitting, and the second brace fitting.

* * * * *